United States Patent [19]

Brooks

[11] Patent Number: 5,739,980
[45] Date of Patent: Apr. 14, 1998

[54] SEAL FOR DISK DRIVES

[75] Inventor: Peter E. Brooks, Rochester, Minn.

[73] Assignee: International Business Machines Corporation, Armonk, N.Y.

[21] Appl. No.: 621,297

[22] Filed: Mar. 22, 1996

[51] Int. Cl.$^6$ ................................................. G11B 33/14
[52] U.S. Cl. ................................... 360/99.08; 360/97.02; 360/97.03
[58] Field of Search ........................ 360/97.01, 97.02, 360/97.03, 97.04, 98.07, 99.04, 99.08; 384/119, 124, 130, 135, 484, 487, 488

[56] References Cited

U.S. PATENT DOCUMENTS

| | | | |
|---|---|---|---|
| 4,186,975 | 2/1980 | Schwarz et al. | 384/465 |
| 4,249,221 | 2/1981 | Cox et al. | 360/97.02 |
| 4,402,515 | 9/1983 | Malott | 277/24 |
| 4,484,754 | 11/1984 | Ballard | 277/53 |
| 4,541,785 | 9/1985 | Höarler | 417/407 |
| 4,576,383 | 3/1986 | Ballard | 277/53 |
| 4,583,213 | 4/1986 | Bracken et al. | 360/97.02 |
| 4,777,549 | 10/1988 | Dushkes et al. | 360/97.03 |
| 4,874,069 | 10/1989 | Lederman | 192/45 |
| 5,150,975 | 9/1992 | Major et al. | 384/465 |
| 5,179,483 | 1/1993 | Lowe | 360/97.03 |
| 5,295,028 | 3/1994 | Elsing | 360/97.01 |

FOREIGN PATENT DOCUMENTS

| | | | |
|---|---|---|---|
| 57-167179 | 10/1982 | Japan | 360/97.03 |
| 55179977 | 11/1982 | Japan | 360/97.02 |
| 59-28281 | 2/1984 | Japan | 360/97.02 |
| 60-261091 | 12/1985 | Japan | 360/97.03 |
| 61-148691 | 7/1986 | Japan | 360/97.03 |

OTHER PUBLICATIONS

IBM Technical Disclosure Bulletin, "Filter Arrangement for Rigid Disk File ...", Elliott et al, vol. 26, No. 2, Jul. 1983.
IBM Technical Disclosure Bulletin, "Prevention of Spindle/Bearing Contaminants ...", Way, vol. 27, No. 6, Nov. 1984.

*Primary Examiner*—Stuart S. Levy
*Assistant Examiner*—David L. Ometz
*Attorney, Agent, or Firm*—John J. Gresens; Matthew J. Bussan

[57] ABSTRACT

A direct access storage device includes a base, a spindle and a hub supporting at least one data storage disk. The hub is mounted for rotation about the spindle by a motor having a bearing assembly. The device also preferably comprises an enclosure which contains the spindle and the hub. An annular member is secured to the hub and surrounds the spindle. The annular member has an upper and lower portion defined by a radial cavity which is open to the spindle. The lower portion is closer to the bearing assembly than the upper portion. The upper portion is exposed to ambient gas within the enclosure. Each of the upper and lower portions have an inside diameter surface facing the spindle with a gap therebetween. The upper portion has a vent hole in fluid communication with the radial cavity. The vent hole is positioned away from the end to the radial cavity to define a containment volume. The gap between the inside surface of the upper portion and the spindle is larger than the gap between the inside surface of the lower portion and the spindle. The gap between the inside surface of the upper portion and the spindle accommodates passage of gas therebetween. The gas passes between the inside surface of the upper portion and the spindle, into the radial cavity and through the vent hole.

15 Claims, 3 Drawing Sheets

SEAL FOR DISK DRIVES

FIELD OF THE INVENTION

The invention relates generally to disc drives, and more particularly, to an assembly for entrapping contaminants in the disk drive environment in order to reduce contact of the contaminants with data storage disks.

BACKGROUND OF THE INVENTION

The continuing effort to increase data storage capacity in magnetic disk drives is concerned largely with increasing the density of data that can be stored on the available recording surface area. Such assemblies typically include an elongate shaft or spindle, a hub fixed to the shaft and supporting the disks, and bearings and bushings at opposed ends of the shaft, to support the shaft, hub and disks for rotation relative to the disk drive housing. Also mounted movably with respect to the housing is an actuator, either of the rotary or linear type, for selectively positioning data transducing heads relative to the disks.

The design and manufacture of such drives involves disparate and often competing needs. The preferred high data storage densities require precision alignment of the disk pack and actuator, stability during rotation of the spindle assembly and resistance to thermal effects due to differing thermal expansion coefficients of materials employed in the drive. The housing must be strong, lightweight, resistant to vibration and provide an effective seal to prevent contamination of the housing interior, particularly in the region of the disks. At the same time, cost considerations stimulate efforts to reduce the number of parts and steps involved in assembling disk drives.

It is essential that the magnetic disc upon which information is to be stored is kept clean to avoid interference with the read/write heads which must operate in very close proximity to the surface of the disc. Toward this end, a gas such as oxygen, nitrogen or air, for example, is ordinarily circulated inside the compartment containing the rotating magnetic disc. This gas may be passed through a filter to constantly remove small particles from the gas within the compartment. Filtration of the gas surrounding the disc helps to maintain the clean atmosphere required for reliable operation of a magnetic disc. However, minute particles, generally of lubricants, will occasionally outgas from the central bearing or bearings upon which the disc is mounted for rotation. If these particles are permitted to migrate onto a surface of the magnetic disc, interference with the reliable operation of the information storage and retrieval system is likely to result.

In order to inhibit the outgassing of particles from the central rotary bearings, shielded bearings (e.g. bearings having non-contacting rubber or metal shields) are ordinarily employed, but even these bearings are capable of outgassing a sufficient quantity of contaminants to interfere with operation of the information storage and retrieval system. Sealed bearings (e.g. bearings having contacting seals) are not generally used in disk drives because of the drag produced. Attempts have been made to overcome contamination problems. For example, Cox et al., U.S. Pat. No. 4,249,221, provides for preventing contamination of a rotating magnetic disc by particles outgassed from the bearings upon which the disc is mounted for rotation by maintaining a differential pressure in the bearing chamber.

Further, Elsing, U.S. Pat. No. 5,295,028, teaches a disk drive assembly which includes a disk pack with an axially retractable spindle assembly and a rotary actuator. The assembly is intended to prevent contamination of the disk drive by dust particles and other contaminants by using labyrinth seals.

Malott, U.S. Pat. No. 4,402,515, discloses a labyrinth seal of abradable design between a shaft and a partition separating regions of high and relatively lower gas pressure in, for example, gas turbine engines. The seal permits limited leakage gas flow toward and through the bearing and pieces of seal material abraded during shaft rotation tend to entrain in the leakage gas flow.

Other types of seal configurations are also known. For example, Ballard, U.S. Pat. Nos. 4,484,754 and 4,576,383 disclose a ring seal between a housing and a rotatable shaft comprising a plurality of ring members generally concentric with the shaft. Major et al., U.S. Pat. No. 5,150,975, discloses a bearing lubricating system which comprises a casing having a bore which defines a reservoir to receive a sufficient volume of a suitable liquid lubricant. All of U.S. Pat. Nos. 4,874,069, and 4,541,785 as well as 4,186,975 disclose lubrication systems for various machinery and apparatus which teach flow passages.

However, even with the use of labyrinth seals or, for example, seals based on fluids, magnetism, or differential pressure, problems exist. Labyrinth seals still release aerosol contaminants into the disk drive environment. Seals based upon fluids, magnetic attraction, or differential pressure may also be difficult to engineer given the disk drive environment and are generally more expensive. Contact seals increase drag and thus maybe unworkable in the disk drive environment.

As a result, a need exists for a non-contact seal useful in the disk drive environment which reduces aerosol contaminants in the disk drive environment which may contaminate the data storage disks.

SUMMARY OF THE INVENTION

In accordance with a first aspect of the invention, there is provided a direct access storage device comprising one or more data storage disks, and a rotatable seal for removing contaminants from gas. The seal is configured to inhibit the contact of the data storage disk with contaminants. The seal comprises an upper portion and a lower portion defining a cavity. The cavity includes a containment volume for trapping contaminants. The seal has a first open side and at least one opening in the seal upper portion. When rotated, the seal draws gas through the seal first open side and vents gas out of the opening in the seal upper portion, the gas contaminants collecting in the containment volume of the seal. The opening in the seal upper portion is similar to a pitot tube. Rotation of the seal induces low pressure in the opening because the opening extends generally 90° from the rotating outside surface of the seal upper portion.

In accordance with a further aspect of the invention, there is provided a direct access storage device comprising a base, a spindle attached to the base, a hub mounted about the spindle, at least one data storage disk, and a seal. The seal comprises an annular member secured to the hub and surrounding the spindle. The annular member has an upper and a lower portion define a cavity open to the spindle. Each of the upper and lower portions of the seal has an inside surface which faces the spindle with a gap therebetween. The inside surface of the lower portion is closer to the spindle than the inside surface of the upper portion. The upper portion has a vent hole in communication with the cavity. The vent hole is configured to define a containment volume. With rotation, gas passes between the upper portion inside surface and the spindle into the cavity and through the vent hole.

In accordance with a preferred aspect of the invention, there is provided a direct access storage device comprising a base, a spindle fixedly attached to the base, and a hub. The hub supports at least one data storage disk and is mounted for rotation on the spindle by a motor having a bearing assembly. An enclosure contains the spindle and the hub. An annular member is secured to the hub and surrounds the spindle. The annular member has an upper and lower portion defined by a radial cavity open to the spindle. The lower portion of the member is closer to the bearing assembly than is the upper portion. The upper portion is exposed to gas within the enclosure. Each of the upper and lower portions has an inside surface facing the spindle with a gap, without being in contact with the spindle. The member upper portion has a vent hole in fluid communication with the radial cavity. The vent hole is positioned away from the end of the radial cavity to define a contaminant volume. The gap between the inside surface of the upper portion and the spindle is larger than the gap between the inside surface of the lower portion and the spindle. The gap between the inside surface of the upper portion and the spindle provides an accommodating passage for the flow of gas therebetween. The gas passes between the inside surface of the upper portion and the spindle, into the radial cavity and through the vent hole.

The typical seal application comprises a stationary shaft, a rotating hub, ball bearing, and rotating seal. A gap is formed between the shaft and the inner surface of the seal. A cavity or central radial groove is closed to the outside diameter of the seal. Into the upper side of the cavity, at some midpoint position outside of the bearing, are one or more vent holes. As the motor spins, the vent holes on the exterior face of the seal induce a low pressure in the cavity. Due to proximity and low pressure, lubricant laden air is introduced into the cavity at the gap. Atomized bearing lubricant is removed from the data storage element environment by drawing it into a rotating cavity intrinsic to the spindle motor, which centrifugally captures it from the ambient gas. The high rotational speed of the spindle forces contaminants, such as lubricant out to the back of cavity where it remains. The seal centrifugally separates contaminants from gas by inducing the flow of gas into itself and thereby indefinitely contains accumulated lubricant.

In the context of this invention, a gas is any vapor which may be induced, drawn, placed, or otherwise found in a direct access storage device environment including oxygen, nitrogen, argon, air, and the like. A contaminant includes any organic or inorganic particulate, solid, liquid, gas, or mixture thereof which, if found on data storage elements will reduce the operability, or even preclude the operation, of the system. An aerosol is a gas which contains one or more solid, liquid or gas contaminants.

DETAILED DESCRIPTION OF THE PREFERRED EMBODIMENTS

Figure 1:
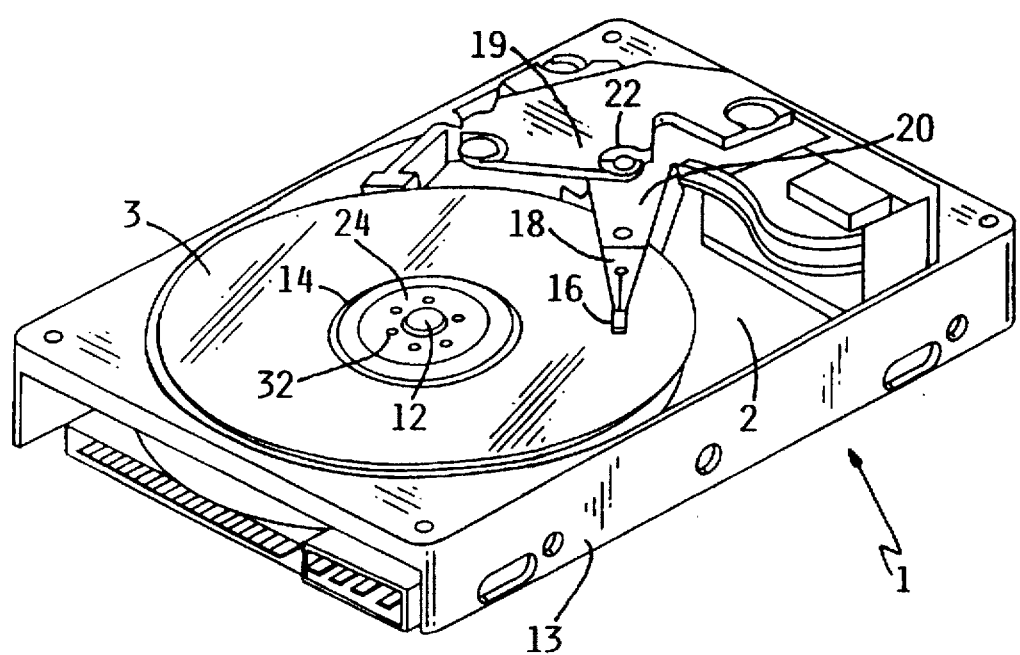
FIG. 1 is a perspective view of a disk drive assembly using one embodiment of the seal of the invention.
Figure 2:
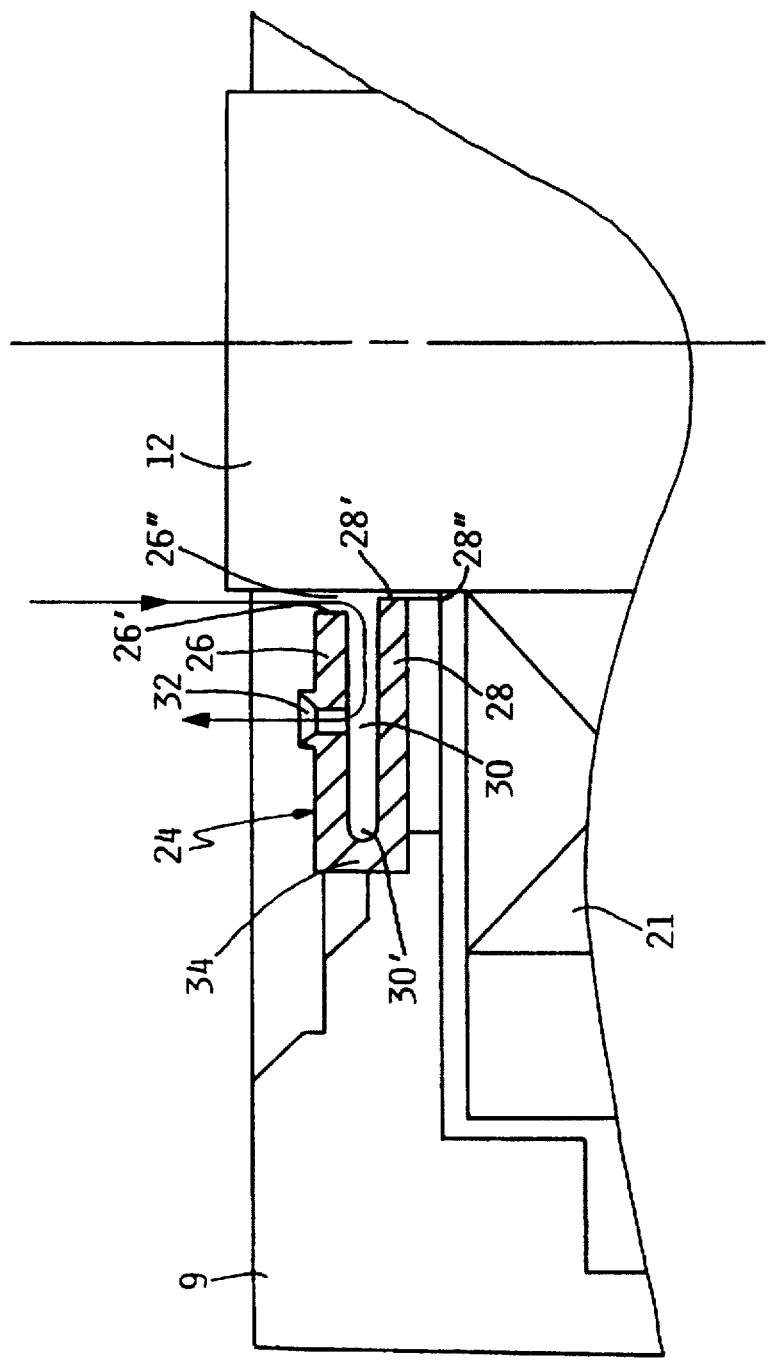
FIG. 2 is a cutaway side view of a direct access storage device containing a seal in accordance with one aspect of the invention.
Figure 3:
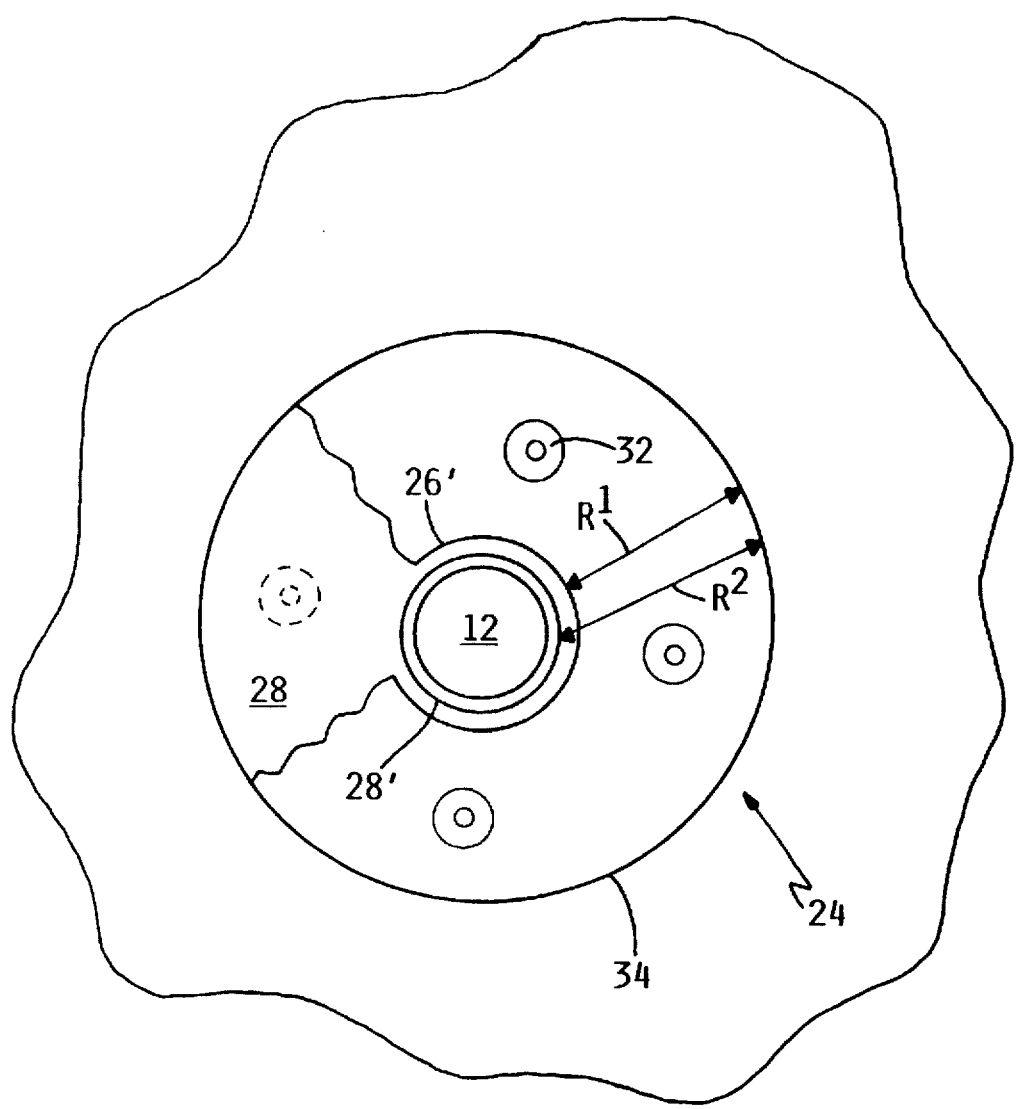
FIG. 3 is a partial cutaway top plan view of the seal shown in FIG. 1.

Referring now to FIGS. 1 through 3 wherein like parts are designated with like numerals throughout these several different views, a direct access storage device 1 is illustrated.

The direct access storage device has a base 2, FIG. 1. The spindle motor assembly 14 is fixedly attached to the base 2. A hub 9 supporting at least one data storage disk is mounted, for rotation, about the spindle motor assembly 14 by a motor (not shown) having a bearing assembly 20, FIG. 2. There is also shown an enclosure 13 containing the spindle and the hub.

In greater detail, FIG. 1 provides a perspective view of an illustrative data storage device or head disk assembly incorporating the teachings of the invention. The assembly 1 includes a disk 3 on which a magnetic medium is disposed. The disk 3 is rotated at high speeds about a spindle motor assembly 14. A magnetic transducer or head 16 is suspended over the disk at the end of a load beam 18. The head 16 and load beam 18 are suspended at the proximal end of an arm 20. The distal end of the arm 20 provides an armature within a voice coil actuator motor 19. The actuator motor 19 induces moments in the arm 20 about a pivot point 22 and thereby moves the head 16 in a general radial direction over the disk 3. The assembly is mounted within a frame 13 or disk drive enclosure. Spindle actuator motor assembly 14, motor 19, as well as the head 16 are activated by a host system through an electronic circuit disposed on a circuit board.

A seal 24 shown as an annular member is secured to the hub and surrounds the spindle 12. The seal or annular member 24 has an upper 26 and lower 28 wall or portion. These upper and lower walls define a radial cavity 30 (FIG. 2) open to the spindle 12. The seal 24 is not in contact with the spindle 12. The lower portion 28 is closer to the bearing assembly 21 than the upper portion 26. The upper portion of the annular member 24 may be exposed to gas within the enclosure 13. Each of the upper and lower portions have inside surfaces, 26' and 28', respectively, facing the spindle 12.

There is a gap between each of the inside surfaces and the spindle. Preferably, the gap 26" between the upper portion 26 of the seal and the spindle 12 is larger than the gap 28" between the lower portion 28 of the seal and the spindle. The upper portion of the annular member generally has one or more vent holes 32. These vent holes 32 are in fluid communication with the radial cavity 30. Preferably, the vent holes are also positioned away from the end of the radial cavity to define an aerosol trap or containment volume 30'.

The gap between the inside diameter surface of the upper portion 26 of the seal and the spindle 12 is generally larger than the gap between the inside diameter surface of the lower portion 28 and the spindle 12. The gap 26" between the inside surface 26' of the upper portion 26 and the spindle 12 accommodates passage of gas through that gap 26". The gas passes between the inside surface 26' of the upper portion 26 of the seal or annular member 24 and the spindle 12 into the cavity 30 and through the vent hole 32. Forces created by the rotation of the seal draw contaminants into the containment volume 30' of the cavity 30. The opening 32 in the seal upper portion 26 is similar to a pitot tube. Rotation of the seal induces low pressure in the opening 32 because the opening extends generally 90° from the rotating outside surface of the seal upper portion 26.

Turning to a preferred aspect of the invention, a seal can be seen in FIG. 1. The seal generally functions during rotation to induce air flow within the direct access storage device, thereby trapping contaminants. By inducing or drawing gas into the seal structure (see FIG. 2, arrow) any contaminant contained in the gas is also drawn into the seal structure. The gas is then vented from the seal 24 at one or more openings 32. While in cavity 30, the gas is subjected to circumferential force created by the spinning of the disk drive. While the gas will vent from opening 32, contaminants will be forced to the outer circumference or wall 34 due to the greater mass of the contaminants and the forces induced within the seal by rotation.

To this end, the seal may take any number of configurations, shapes, or sizes as necessary for the given application. For example, the seal may be annular, hexagonal, square, oblong, etc. As can be seen in FIG. 3, preferably, the seal is an annular member having a central opening through which the spindle 12 may fit. The annular nature of the seal facilitates high speed disk drive rotation, (typically about 3600 to 7200 or more rpm), which are common in direct access storage devices. The annular shape combined with the high speed of rotation also facilitates the balanced entrapment of contaminants so as not to create a lack of alignment in the rotation.

Generally, the seal of the invention comprises a lower portion, an upper portion, a cavity and containment volume within the cavity. The lower portion functions to seal the disk drive bearings. The lower portion of the seal 28 has a radius ($R^2$) measured from the outer wall 34 which is generally larger than the radius ($R^1$) of the upper portion measured from the outer wall 34, (FIG. 3). The radius ($R^2$) of the lower portion 28 is preferably large enough to seal the bearing 20 and motor 18 compartments to reduce the exhaustion of contaminants from these compartments into the general disk drive environment. The lower portion 28 of the seal preferably has an annular shape (FIG. 3) which follows the shape of the upper portion 26 of the seal. Preferably the lower portion inside surface 28' is closer to the spindle 12 than the upper portion inside surface 26'.

The cavity 30 assists in inducing, processing, and venting disk drive gas. The cavity 30 also functions to hold contaminants which may be found in that gas and drawn from the gas through centrifugal force in the spinning motion of the seal. Generally, the cavity may take any number of shapes in accordance with these two functions.

As can be seen in FIG. 2, in accordance with one preferred aspect of the invention, the cavity lies in a substantially horizontal plane between the upper and lower portions of the seal. The cavity 30 also comprises a containment volume 30' defined by the configuration of the cavity 30 and the position of vent hole 32. The cavity 30 may also comprise a containment volume 30' as a recessed portion of the cavity created by recessing or lowering lower portion 28, adjacent vent hole 32 and towards outer wall 34. This reversed area functions to trap and contain contaminants which have been reduced from the gas in the disk drive environment. Any number of other configurations are also possible in accordance with the invention. For example, seal lower portion 28 may have a lip or rise at inside surface 28' which prevents the contaminants from flowing back into the spindle and motor area of the disk drive system.

The upper portion of the seal functions to facilitate the induction and venting of gas into and out of the seal. Accordingly, as can be seen in FIGS. 2 and 3, the upper portion of the seal may have a greater diameter, positioning this portion of the seal further away from the spindle 12, than seal lower portion 28.

The seal may contain any number of vent holes across the upper portion. The upper portion has a given radius ($R^1$) and the vent holes may be located in any number of positions across that radius ($R^1$). Openings 32 may be sized and configured to promote the adequate containment of contaminants within the seal. Positioning openings 32 closer to outer wall 34 subjects both gas and any present contaminants to centrifugal force for a longer period of time, once in seal 24. However, positioning opening 32 closer to outer wall 34 also reduces the size of containment volume 30' and, in turn, the volume of contaminants which may be contained therein.

As can be seen in the preferred embodiments of the invention shown in FIGS. 2 and 3, the seal may also have an outer wall 34 which functions to define a containment volume 30'. As a result, gas-borne contaminants may be drawn into the seal from the overall operating environment of the direct access storage device by the rotating motion of the assembly. The high speed of rotation will create two effects. The first effect will be to force the gas, having a lower relative mass, out of the vent hole in the upper portion of the seal. The second effect will be to force the contaminants, having a higher relative mass, into the gas containment area.

The above specification, examples, and data provide a complete description of the claimed invention. Since many embodiments of the invention can be made without departing from the spirit and scope of the invention, the invention resides on the claims hereinafter appended.

I claim as the invention:

1. A direct access storage device comprising one or more data storage disks, and a rotatable seal for removing contaminants from gas, said seal configured to inhibit the contact of said one or more data storage disks with said contaminants, said seal comprising an upper portion and a lower portion, said seal having a first open side, a second closed side and at least one opening in said seal upper portion, said upper portion, lower portion, and second closed side defining a cavity, wherein when said seal is rotated, said seal draws gas through said seal first open side and vents gas from the opening in said seal upper portion, said gas contaminants collecting in the cavity of said seal.

2. The device of claim 1, wherein said device further comprises a spindle, said device seal being positioned adjacent said spindle.

3. The device of claim 2, wherein said seal comprises an annular member positioned around said spindle.

4. The device of claim 1, wherein said seal comprises an annular member having an outer side and an inner side, said inner side defining an open central area in said annular member, said seal first open side being adjacent to said open central area and said annular member inner side.

5. The device of claim 4, wherein said seal upper portion has a first radius and said seal lower portion has a second radius, said first radius being less than said second radius when measured from the outer side of said annular member.

6. The device of claim 1, wherein said seal cavity is positioned adjacent said upper portion opening.

7. The device of claim 6, wherein said seal upper portion opening lies midway across the radius of said seal upper portion.

8. The device of claim 7, wherein the cavity comprises a containment volume configured between said seal upper portion and said seal lower portion, said containment volume being configured as a substantially horizontal longitudinal volume.

9. The device of claim 1, said device further comprising a spindle, said seal comprising an annular member, said annular member having an outer side and an inner side, said annular member outer side comprising a wall positioned adjacent said seal upper portion and lower portion, said annular member inner side positioned adjacent said spindle.

10. A direct access storage device comprising a base, a spindle attached to said base, a hub mounted about said spindle, at least one data storage disk mounted on said hub, and a seal, said seal comprising an annular member secured to said hub and surrounding said spindle, said annular member having upper and lower portions defining a cavity open to said spindle, each of said upper and lower portions having an inside surface adjacent said spindle with a gap therebetween, said lower portion inside surface being closer to said spindle than said upper portion inside surface, said upper portion having a vent hole in communication with said cavity, said vent hole configured to define a containment volume in said cavity wherein upon rotation, gas passes between said upper portion inside diameter surface and said spindle into said cavity and through said vent hole.

11. The device of claim 10, wherein said hub is mounted for rotation about said spindle by a motor having a bearing assembly.

12. The device of claim 10, wherein said spindle and said hub are contained within an enclosure.

13. The device of claim 10, wherein said cavity is radial.

14. The device of claim 10, wherein said seal is rotatable, said seal upper portion and lower portion inside surfaces being circular, each of said upper portion and lower portion inside surfaces defining respective upper and lower gaps between said spindle and said respective upper and lower portion inside surfaces, said upper gap being larger than said lower gap.

15. A direct access storage device comprising:

a base;

a spindle fixedly attached to said base;

a hub supporting at least one data storage disk and being mounted for rotation about said spindle by a motor having a bearing assembly;

an enclosure containing said spindle and said hub;

an annular member secured to said hub and surrounding said spindle, said annular member having upper and lower portions defined by a radial cavity, said annular member having a first end and a second end, wherein said annular member second end is open to said spindle, said lower portion being closer to said bearing assembly than said upper portion, said upper portion being exposed to gas within said enclosure, each of said upper and lower portions having an inside surface facing said spindle with a gap therebetween, said upper portion having a vent hole in fluid communication with said radial cavity and positioned away from said annular member first end to said radial cavity to define an aerosol trap, said gap between said inside surface of said upper portion and said spindle being larger than said gap between said inside surface of said lower portion and said spindle, said gap between said inside diameter surface of said upper portion and said spindle accommodating passage of said gas therebetween, wherein said gas passes between said inside surface of said upper portion and said spindle, into said radial cavity and through said vent hole.

* * * * *